United States Patent
Tschabrun et al.

[15] 3,697,910
[45] Oct. 10, 1972

[54] MAGNET ASSEMBLY FOR ELECTRIC BRAKES

[72] Inventors: Richard G. Tschabrun, Dayton; Carlos P. Afanador, Centerville, both of Ohio

[73] Assignee: The Dayton Steel Foundry Company, Dayton, Ohio

[22] Filed: Sept. 7, 1971

[21] Appl. No.: 178,397

Related U.S. Application Data

[63] Continuation of Ser. No. 881,413, Dec. 2, 1969, abandoned.

[52] U.S. Cl. ................. 335/296, 188/79.5, 188/164
[51] Int. Cl. ................................................. H01f 7/00
[58] Field of Search ............. 335/281, 296, 297, 299; 188/79.5, 138, 164; 192/84 A–84 C, 107 M

[56] References Cited

UNITED STATES PATENTS

| | | | |
|---|---|---|---|
| 2,940,019 | 6/1960 | Steinhauser | 335/299 |
| 3,092,307 | 6/1963 | Heidorn | 192/84 A |
| 3,162,285 | 12/1964 | Sala | 335/281 X |

*Primary Examiner*—George Harris
*Attorney*—Lawrence B. Biebel et al.

[57] ABSTRACT

A magnet assembly for an electric brake employs a potting compound for retaining the electric coil within the magnet, which compound also forms a portion of the friction face of the magnet.

4 Claims, 4 Drawing Figures

PATENTED OCT 10 1972
3,697,910
FIG-1
FIG-3
FIG-2
FIG-4
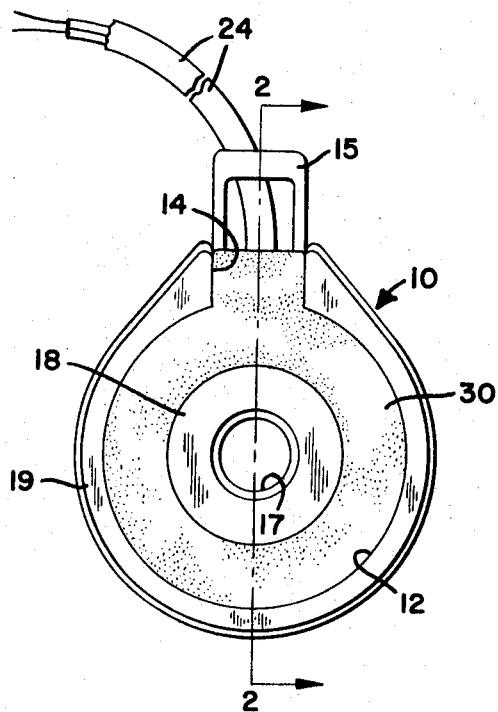
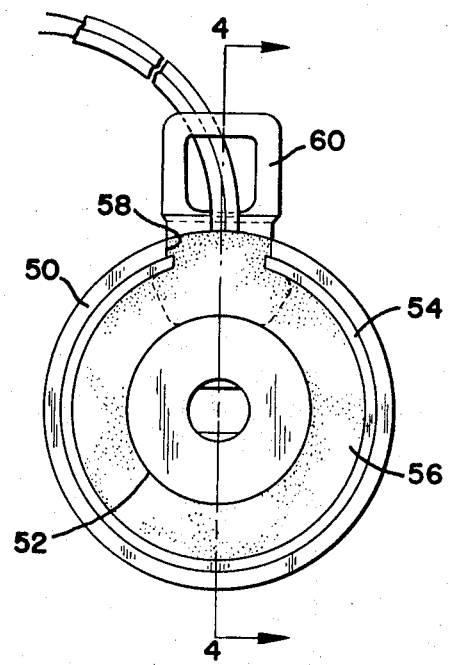
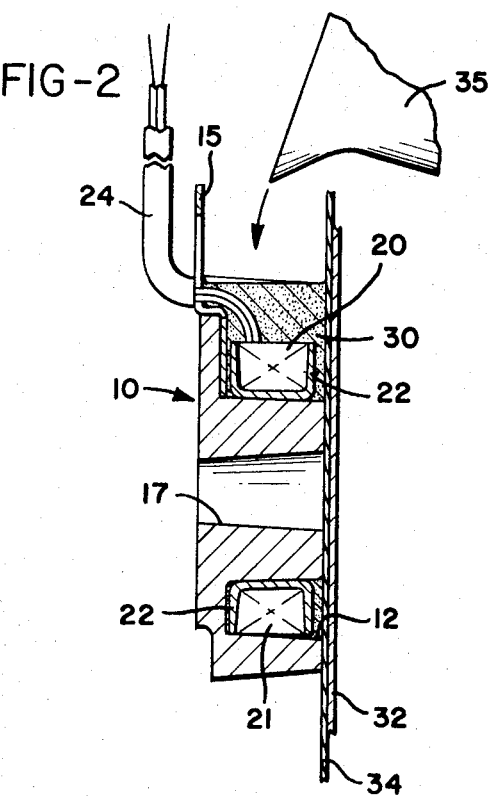
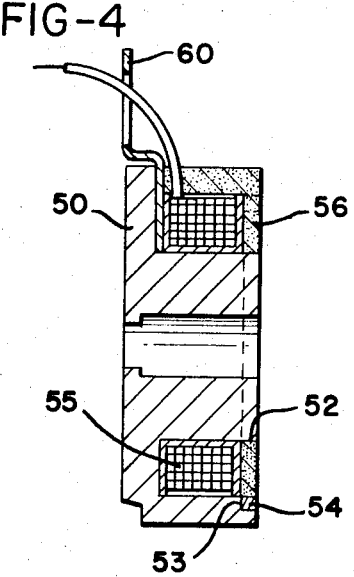
INVENTORS
RICHARD G. TSCHABRUN &
CARLOS P. AFANADOR
BY
Marechal, Biebel, French & Bugg
ATTORNEYS

3,697,910

MAGNET ASSEMBLY FOR ELECTRIC BRAKES

RELATED APPLICATIONS

This application is a continuation of Ser. No. 881,413, filed Dec. 2, 1969 now abandoned.

BACKGROUND OF THE INVENTION

The present invention is directed to the art of electric brakes and more particularly to a magnet assembly and a method of making the same for brakes of the general type shown in the U.S. Pat. Nos. of Phair 2,304,118 of 1942 and Penrose 2,273,065 of 1942. Brakes of the type shown in the above-identified U.S. patents are commonly used in mobile homes, house and boat trailers and the like, and employ an electric magnet which is secured to the end of a lever arm which operates in close sliding engagement with a rotating armature plate. When the magnet is energized a magnetic flux path is formed between the magnet and the rotating armature which causes the magnet to tend to grip the armature and be drawn along with it. This causes the lever arm to be moved through an angle. The opposite end of the lever arm is provided with a brake shoe actuating toggle and causes the brake shoes to be expanded outwardly into frictional engagement with the brake drum Electric magnet assemblies for this purpose have commonly been formed with a face of friction surface comprising a pad or insert of organic brake pad or friction material, as shown in U.S. Pat. Nos. 2,024,847, 3,037,586, 3,049,192 and 3,244,944. The insert of friction material defines the wearing, as well as the coefficient of friction, characteristics between the magnet assembly and the rotating armature.

A particular problem with electric brake magnets is that of sealing out all moisture, since the presence of moisture will reduce the life of the electric magnet. Another problem is that of prolonging the wearing qualities of the magnet face. The face of the magnet is always in always in rubbing contact with the armature, even when the brakes are not being used. This is due to the necessity of maintaining the magnet at the armature without air gap, so that the brakes can immediately be used, and a low force coil spring is commonly positioned between the magnet arm and the magnet to maintain the rubbing contact. During braking there is a much greater frictional rubbing with the armature. These factors combine to decrease the life of the magnet face.

SUMMARY OF THE INVENTION

The present invention is directed to an improved magnet assembly and a method of making the same in which the separate insert of friction material is eliminated and in which the potting compound retaining the magnet within the magnet body cavity also forms the friction face. The potting compound is poured into a suitable opening formed in the magnet body, with the coil and coil form in place, while the magnet is electrically energized. For this purpose, a temporary armature may be employed and a sheet of release material positioned between a magnet face and armature. When energized, the magnet body will draw itself tightly toward the armature and against the release material, and the energization of the magnet will also cause preheating of the magnet body. The potting compound may then be poured in place with the annular cavity while the magnet is so energized and allowed to set up, at which time the magnet can be deenergized and separated from the sheet of release material and the armature.

In another form of the invention, the potting compound is injected by transfer or injection molding into the magnet cavity. Also, a hardened spring steel insert is retained by the injection molded material at the face surface of the magnet to improve its wearing qualities.

Another object is to provide a moisture resistant assembly by complete encapsulation of the coil.

It is accordingly an important object of the present invention to provide an electric magnet for a brake in which the necessity for employing a separate insert of organic brake material is eliminated.

Another object of the invention is the provision of an electric brake magnet in which the potting compound also forms the friction material for the magnet.

A further object of the invention is the provision of a novel method of manufacturing an electric brake magnet.

These and other objects and advantages of the present invention will be apparent from the following description, the accompanying drawings, and the appended claims.

BRIEF DESCRIPTION OF THE DRAWINGS

FIG. 1 is a plan view looking at the face of an electric magnet assembly made in accordance with this invention;

FIG. 2 is a vertical section through the magnet assembly taken generally along the line 2—2 of FIG. 1 and also showing the method of pouring and filling the magnet assembly; and FIGS. 3 and 4 are respectively a plan view and section of a modified form of the invention.

DESCRIPTION OF PREFERRED EMBODIMENT

Referring to the figures of the drawing, an electric magnet assembly is illustrated in FIGS. 1 and 2 as including an electromagnetic body 10 which may be formed of suitable magnet material, preferably sintered iron. The body is generally circular when viewed either from the front, as shown in FIG. 1, or from the rear, and is formed with a forwardly opening annular magnet cavity 12. The cavity 12 opens radially at the top of the magnet through a radially aligned opening 14 providing means for filling the cavity 12, and also providing means for the insertion of an anti-rotate tab 15. The body 10 is further formed with a centrally positioned arm-receiving opening 17. The cavity 12 and housing 10 define a pair of concentric pole pieces consisting of a control inner pole 18 and an annular outer pole 19, defining a common planar face.

The electromagnet illustrated generally at 20 in FIG. 2 includes a magnetic coil 21 wound on an outwardly opening coil form 22. The coil form 22 is proportioned to be received within the body recess 12 surrounding the pole 18 with the lead wires 24 extending outwardly through the opening 14. The axial depth of the annular recess 12 exceeds the axial dimension of the coil form 22 so that when the coil is inserted substantially to the bottom of the recess, it is recessed below the plane of the faces of the poles 18 and 19. Preferably, the recess 12 is slightly axially tapered so as to form a frictional engagement or fit with the inside surface of coil form 22.

The electromagnet 20 is potted in place by potting compound 30, which completely fills all of the voids in the cavity 12 and is formed flush with the pole faces. The present invention includes a novel method for potting the magnet assembly of this invention. For this purpose, a temporary armature plate 32 is provided. A sheet of release material 34 is positioned between the armature plate 32 and the magnet before it is energized. When energized, the magnet body will draw itself tightly toward the armature and against the release material. This energization causes the coil to be magnetically attracted to the bottom of the magnet body, thus allowing the potting compound to flow between the coil and release material. The energization also causes a preheating of the magnet body. The potting compound 30 may then be poured into the cavity through the opening 14, as illustrated by the pouring flask 35 of FIG. 2, until the cavity is completely filled, as shown. The magnet may remain energized until the potting compound has assumed an initial set, at which time the magnet may be deenergized, and the armature plate 32 and sheet 34 removed. After complete setting and curing, the magnet assembly may be finished by grinding or polishing across the pole faces and the exposed surface of the compound 30.

The potting compound 30 thus forms the friction face of the magnet assembly. The potting compound should after curing, have a hardness which is comparable to the hardness of organic lining material and may be in the range of 20–70 when measured with a Gogan hardness tester, using a three-fourth inch diameter penetrator with a 1,500 kg load. (Four Gogan = approximately 0.001" penetration). The coefficient of friction should also be comparable to that of organic materials, and a range of a minimum of 0.2 up to 0.6 or more is satisfactory.

The potting compound should also have a resistance to wear and abrasion comparable to that of organic lining material so as to meet a 50,000 mile durability requirement, or more. The coefficient of thermal expansion is not particularly critical, and the thermal expansion coefficient can be the same as that of the body 10 or up to 25 percent or more greater than that of iron. Further, the material 30 should be relatively inert to moisture and direct water contact, as contact by water is frequently experienced on electric brakes used for boat trailers and the like. It should also be relatively inert to salt and salt water.

Thermosetting potting compounds of the epoxy, phenolic and furan type may be employed. As an example, a suitable low cost, low viscosity epoxy casting resin is sold under the trademark STYCAST No. 2057 of Emerson & Cuming, Inc., Canton, Mass., which is mixed at room temperature with a suitable catalyst of the amine type, as is well known in the art, and poured at room temperature. The magnet may be cured at room temperature for eight hours, although an elevated temperature results in a substantially reduced curing time. The material is cured one hour at 160°F or 30 minutes at 200°F. Curing time is substantially reduced by maintaining the electric current to the electric magnet 20 as this has the effect of elevating the body temperature to approximately 160°F. In addition, the energization of the electromagnet over this period of time provides a convenient life test. The resulting magnet has an average coefficient of friction of approximately 0.47 at 250°F as measured on a F.A.S.T. test machine.

The embodiment of FIGS. 3 and 4 illustrating a further form of the invention made by a somewhat different method. In this embodiment, the magnetic body 50, formed of sintered iron or other suitable material, has a forwardly opening annular magnetic cavity 52 similar to the cavity 12 of the embodiment of FIGS. 1 and 2.

The cavity is further formed with an inwardly opening annular shoulder 53 to receive a wear resistant insert 54 of a suitable hard material, such as a spring steel ring. The ring 54, when received in the cavity 52, is flush with the friction face of the magnet.

The embodiment of FIGS. 3 and 4 include an electric coil 55 similar to the coil 21 of the embodiment of FIGS. 1 and 2. The coil 55 is received within the annular magnetic cavity and is recessed therein inwardly of the face of the magnet. This coil 55 and the ring 54 are retained in place, and the coil is sealed, by a thermoplastic potting compound 56 which is injection or pressure molded into the cavity for the purpose of completely filling the cavity to a point completely flush with the face of the magnet. For this purpose, the body 50, with the coil 55 in place, is held and received within a suitable injection molding die, and the thermoplastic potting material is applied through a die orifice under high pressure into the annular cavity 52. While the die inlet may be arranged to apply the molten plastic material through the radial opening 58 which receives and retains the anti-rotational tab 60, the compound is preferably injected at the face opening of the cavity 52 so that the force of injection serves to urge the magnetic coil 55 back into the recess. When injection molding is employed, there is no need for energizing the coil 55, and the injected thermoplastic material 56 also serves to retain the ring 54 in place seated on the shoulder 53.

In this embodiment, the hardened ring 54 serves materially to increase or lengthen the service life of the magnet and decreasing the rate of wear at the magnet face. As specified above, the coefficient of friction between the magnet and the armature has been found not to be particularly critical, and the operation of the brake magnet is not adversely affected by the incorporation of the ring 54.

The thermoplastic material 56 must be one which is capable of forming a good moisture proof seal with the coil and one which adheres well to the metal of the body 50. It must also be compatible with the coil and be able to withstand maximum temperatures in the range of 350°–380°F. Good moisture, salt and abrasion resistance are also desirable qualities.

The material may be transfer molded or injected in situ and may include the polypropylenes, polystyrenes particularly the ABS terpolymers and the glass filled varieties, the fluorocarbons such as the polychlorotrifluoroethylene, polyphenylene oxide, polypropylene, polyvinyls, phenoxy, and polysulfone, as examples. Another suitable compound is a polyester is isophthalic acid of Wabash Magnetics Inc., Huntington, Indiana.

It is accordingly seen that the present invention provides simplified magnet assemblies for electric brakes of the type described. The potting compound serves both as a retainer and sealant for the coil 21 and as the friction material for the magnet assembly. The necessity for inserting and retaining a separate friction pad is thus eliminated.

While the method herein described, and the forms of apparatus, constitute preferred embodiments of the invention, it is to be understood that the invention is not limited to this precise method and form of apparatus, and that changes may be made in either without departing from the scope of the invention which is defined in the appended claims.

What is claimed is:

1. In an electric brake in which an electric magnet is mounted on an actuating arm with a running surface thereof in running frictional engagement with a rotating brake armature, the improvement in magnet structure comprising a ferrous magnet body having means defining an annular coil cavity and further defining an inner pole and an annular outer pole separated by said cavity, each of said poles terminating at a common pole face plane, an electromagnet coil received in said cavity and recessed inwardly of said plane, a resin potting compound filling said cavity flush with said poles at said plane substantially free of voids and sealing said electromagnet coil within said cavity, said pole faces and said compound combining to form a common wear-resistent magnet running surface.

2. The brake of claim 1 in which said compound is a poured and cured epoxy casting resin.

3. The brake of claim 1 in which said compound is an injected thermoplastic polyester.

4. In an electric brake in which an electric magnet is mounted on an actuating arm with a running surface thereof in running frictional engagement with a rotating brake armature, the improvement in magnet structure comprising a sintered iron magnet body having means defining an annular coil cavity and further defining an inner pole and an annular outer pole separated by said cavity, each of said poles terminating at a common pole face plane, an electromagnet coil received in said cavity and recessed inwardly of said plane, a plastic resin compound filling said cavity flush with said poles at said plane substantially free of voids and sealing said electromagnet within said cavity, said compound having a hardness in the range of 20 to 70 Gogan and a coefficient of friction between 0.2 and 0.6, said pole faces and said compound combining to form a common wear-resistent magnet running surface.

* * * * *